(12) United States Patent
Abdallah et al.

(10) Patent No.: US 11,318,585 B2
(45) Date of Patent: May 3, 2022

(54) SYSTEMS AND DEVICES FOR ASSISTED COMPONENT INSERTION

(71) Applicants: GM GLOBAL TECHNOLOGY OPERATIONS LLC, Detroit, MI (US); Université Laval, Quebec (CA)

(72) Inventors: Muhammad E. Abdallah, Rochester Hills, MI (US); James W. Wells, Rochester Hills, MI (US); Clement Gosselin, Quebec (CA); Thierry Laliberte, Blanches (CA); Jerome Landure, Québec (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 269 days.

(21) Appl. No.: 16/840,583

(22) Filed: Apr. 6, 2020

(65) Prior Publication Data

US 2021/0308839 A1 Oct. 7, 2021

(51) Int. Cl.
  *B25B 11/00* (2006.01)
  *B25B 11/02* (2006.01)
  *B62D 65/02* (2006.01)

(52) U.S. Cl.
  CPC ............ *B25B 11/02* (2013.01); *B62D 65/026* (2013.01)

(58) Field of Classification Search
  CPC ........... B25B 11/00; B25B 11/02; B25B 1/00; B25B 1/02; B25B 27/00; B23Q 1/25; B23Q 1/28; B23Q 1/0063; B23Q 3/00; B23P 11/00; B23P 11/005; B23P 11/027
  See application file for complete search history.

(56) References Cited

U.S. PATENT DOCUMENTS

| | | | | |
|---|---|---|---|---|
| 4,723,053 A | * | 2/1988 | Amaya | H02G 15/10 174/41 |
| 5,785,358 A | * | 7/1998 | Kujawski | F16L 37/0987 285/319 |
| 6,464,264 B1 | * | 10/2002 | Ito | F16L 37/0987 285/921 |
| 2011/0309616 A1 | * | 12/2011 | Mager | F16L 39/02 285/382.7 |

* cited by examiner

*Primary Examiner* — Lee D Wilson
(74) *Attorney, Agent, or Firm* — Vivacqua Crane PLLC

(57) ABSTRACT

An insertion system includes an insertion device including a body defining a longitudinal axis, the body including a wall having an outer surface and an inner surface defining a cylindrical opening through the body, the body having a first body portion and a second body portion formed by separating the body along the longitudinal axis, an effector configured to interface with the insertion device, the effector having an effector body, a first mechanism coupled to the effector body and coupled to the first body portion of the insertion device, and a second mechanism coupled to the effector body and coupled to the second body portion of the insertion device, and an insertion mechanism coupled with the effector body. The insertion mechanism enables a force application at a position offset from the insertion device.

20 Claims, 5 Drawing Sheets

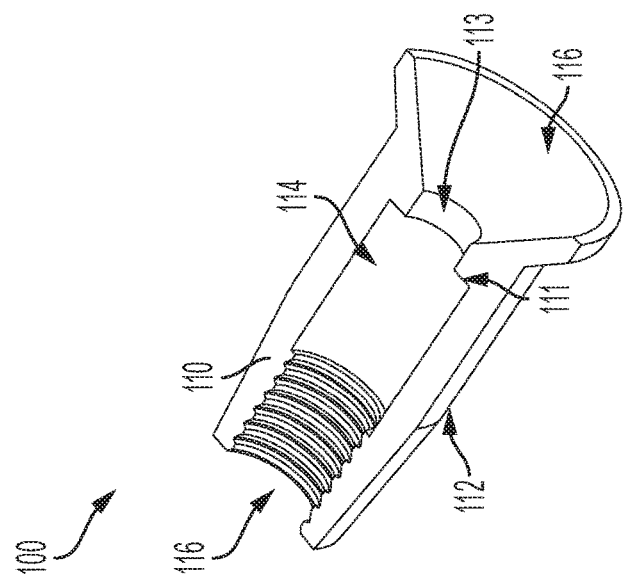
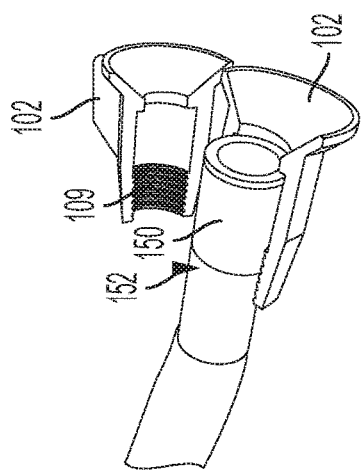
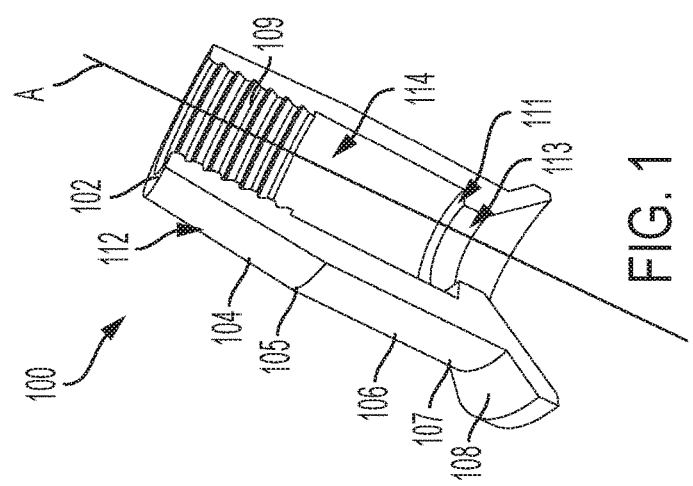

SYSTEMS AND DEVICES FOR ASSISTED COMPONENT INSERTION

INTRODUCTION

The present disclosure relates generally to systems and devices that provide human operators with reach and force assistance for insertion of components for manufacturing applications.

Among the components that are assembled in a vehicle, some use an application of large forces to be assembled. In many scenarios, the assembly locations are located far from the operator. In some applications, the component may be difficult to grasp. In other applications, the component may be far from the operator, affecting the operator's posture, relative position, and the moment applied by the operator to properly apply the assembly force.

SUMMARY

Embodiments according to the present disclosure provide a number of advantages. For example, embodiments according to the present disclosure enable improved operator ergonomics to perform assembly operations that would normally require reach, posture changes, or force that exceed ergonomic limits. In various embodiments, the systems discussed herein include improved devices to grasp and manipulate a component, such as, for example and without limitation, an end of a hose. In various embodiments, the operator can manipulate the end of the hose from a distance. Various embodiments also include active elements to contribute to the insertion including dithering and impulses. In various embodiments, feedback, such as a force feedback, is provided to the operator to assist in the insertion process.

In one aspect of the present disclosure, an insertion device includes a body defining a longitudinal axis. The body includes a wall having an outer surface and an inner surface defining a cylindrical opening through the body. The body further includes a first portion, a second portion, and a third portion arranged along a length of the body, the first portion positioned at a first end of the body and including a gripping surface arranged on the inner surface, the second portion positioned contiguous with the first portion and the inner surface of the second portion defining an expansion area, and the third portion positioned at a second end of the body opposite the first end and defining a conical section at the second end of the body.

In some aspects, the body includes a first body portion and a second body portion formed by separating the body along the longitudinal axis.

In some aspects, the third portion includes a first surface contiguous with a second surface such that the first and second surfaces define a lip extending from the inner surface of the body.

In some aspects, the gripping surface includes a plurality of threads.

In another aspect of the present disclosure, an insertion system includes an insertion device including a body defining a longitudinal axis. The body includes a wall having an outer surface and an inner surface defining a cylindrical opening through the body, the body having a first body portion and a second body portion formed by separating the body along the longitudinal axis. The insertion system includes an effector configured to interface with the insertion device, the effector having an effector body, a first mechanism coupled to the effector body and coupled to the first body portion of the insertion device, and a second mechanism coupled to the effector body and coupled to the second body portion of the insertion device. The insertion system also includes an insertion mechanism coupled with the effector body. The insertion mechanism is configured to enable an insertion force application at a position offset from the insertion device.

In some aspects, the insertion system further includes a sensor coupled to the insertion device and a controller in electronic communication with the sensor, the sensor configured to generate imaging data of a terminal end of the insertion device during an insertion process.

In some aspects, the insertion system further includes an actuator coupled to the insertion device and in electronic communication with the controller, the actuator providing an active impulsive force to the insertion device during the insertion process.

In some aspects, the body of the insertion device further includes a first portion, a second portion, and a third portion arranged along a length of the body.

In some aspects, the first portion is positioned at a first end of the body and includes a gripping surface arranged on the inner surface, the second portion is positioned contiguous with the first portion and the inner surface of the second portion defines an expansion area, and the third portion is positioned at a second end of the body opposite the first end and defines a conical section at the second end of the body.

In some aspects, the third portion includes a first surface contiguous with a second surface such that the first and second surfaces define a lip extending from the inner surface of the body.

In some aspects, the insertion mechanism includes a rod such that the force application is applied parallel to the longitudinal axis defined by the body of the insertion device.

In some aspects, the insertion mechanism includes a stand including a base member and a plurality of support members coupled to the base member, a vertical support member coupled to the base member and coupled to the support members, a vertical adjustment member coupled to and parallel to the vertical support member, a collar encircling the vertical adjustment member, a first horizontal member, a second horizontal member, and a third horizontal member, the first horizontal member rotatably coupled to the collar at a first end and rotatably coupled to the second horizontal member at a second end, the second horizontal member rotatably coupled to the third horizontal member, and the third horizontal member coupled at a first end to the effector via a first vertical member and coupled at a second end to a handle assembly.

In some aspects, the insertion mechanism permits rotation only about the vertical support member and constrains moments related to an insertion force applied to the insertion mechanism at the handle assembly.

In some aspects, the insertion mechanism includes a first horizontal member, a second horizontal member, a vertical support member, a first vertical member, and a trolley, the first horizontal member including a guide member such that the trolley travels within the guide member, the first horizontal member rotatably coupled to the vertical support member, the second horizontal member rotatably coupled to the vertical support member, and the second horizontal member coupled at a first end to the effector via the first vertical member and coupled at a second end to a handle assembly.

In another aspect of the present disclosure, an insertion system includes an insertion device including a body defining a longitudinal axis. The body includes a wall having an outer surface and an inner surface defining a cylindrical opening through the body. The body has a first body portion and a second body portion formed by separating the body along the longitudinal axis. The insertion system includes an effector configured to interface with the insertion device, the effector having an effector body, a first mechanism coupled to the effector body and coupled to the first body portion of the insertion device, and a second mechanism coupled to the effector body and coupled to the second body portion of the insertion device, the first mechanism including a first link and a second link parallel to the first link and the second mechanism including a third link and a fourth link parallel to the third link. The insertion system includes an insertion mechanism coupled with the effector, a sensor coupled to the insertion device, and a controller in electronic communication with the sensor. The insertion mechanism allows movement in rotational and translational degrees of freedom and enables an insertion force application at a position offset from the insertion device while constraining a rotational degree of freedom corresponding to a moment associated with the insertion force.

In some aspects, the insertion system further includes a sensor coupled to the insertion device and a controller in electronic communication with the sensor and the sensor is configured to generate imaging data of a terminal end of the insertion device during an insertion process.

In some aspects, the insertion system further includes an actuator coupled to the insertion device and in electronic communication with the controller, the actuator providing an active impulsive force to the insertion device during the insertion process.

In some aspects, the body of the insertion device further includes a first portion, a second portion, and a third portion arranged along a length of the body, wherein the first portion is positioned at a first end of the body and includes a gripping surface arranged on the inner surface, the second portion is positioned contiguous with the first portion and the inner surface of the second portion defines an expansion area, and the third portion is positioned at a second end of the body opposite the first end and defines a conical section at the second end of the body.

In some aspects, the insertion mechanism includes a stand including a base member and a plurality of support members coupled to the base member, a vertical support member coupled to the base member and coupled to the support members, a vertical adjustment member coupled to and parallel to the vertical support member, a collar encircling the vertical adjustment member, a first horizontal member, a second horizontal member, and a third horizontal member, the first horizontal member rotatably coupled to the collar at a first end and rotatably coupled to the second horizontal member at a second end, the second horizontal member rotatably coupled to the third horizontal member and the third horizontal member coupled at a first end to the effector via a first vertical member and coupled at a second end to a handle assembly, and wherein the insertion mechanism permits or enables rotation only about the vertical support member and constrains moments related to an insertion force applied to the insertion mechanism at the handle assembly.

In some aspects, the insertion mechanism includes a first horizontal member, a second horizontal member, a vertical support member, a first vertical member, and a trolley, the first horizontal member including a guide member such that the trolley travels within the guide member, the first horizontal member rotatably coupled to the vertical support member, the second horizontal member rotatably coupled to the vertical support member, and the second horizontal member coupled at a first end to the effector via the first vertical member and coupled at a second end to a handle assembly.

BRIEF DESCRIPTION OF THE DRAWINGS

The present disclosure will be described in conjunction with the following figures, wherein like numerals denote like elements.

FIG. 1 is a perspective cutaway view of an insertion device, according to an embodiment.

FIG. 2 is a second perspective cutaway view of the insertion device of FIG. 1, according to an embodiment.

FIG. 3 is a perspective view of the insertion device arranged as an open clamshell orientation around a hose end, according to an embodiment.

Figure 5:
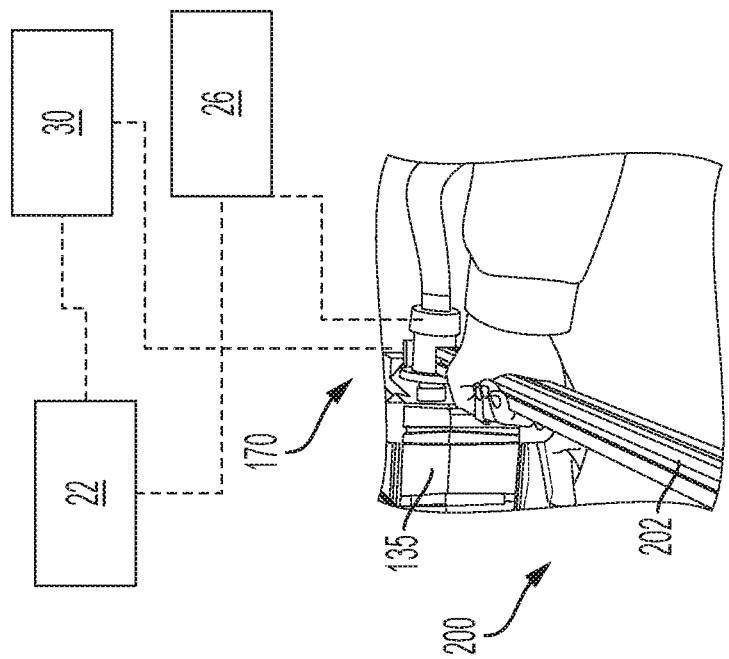
FIG. 5 is a perspective view of an insertion mechanism, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "Left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Assistance tools, such as the systems discussed herein, can improve the ergonomics associated with assembly processes. Systems that allow an operator to perform an assembly operation with a component, such as, for example and without limitation, a hose insertion, from a distance and using a pushing force rather than a lateral force, provide improved assembly mechanics. Adding active elements such as dithering and impulses can also improve the insertion process. Feedback elements, such as force sensors, can provide information regarding the applied force to enable more consistent assembly operations.

A short, hand-manipulated device can be useful if the operator is close to the task but the component, such as a hose, is not easy to grasp. Furthermore, a device with a larger diameter than the component or with a flange helps to apply the insertion force on the component.

FIGS. 1-3 illustrate an insertion device 100. In various embodiments, the insertion device 100 is used to facilitate assembly operations involving components that are difficult to grasp and hold, such as hoses, electric connectors, spark plugs, etc., for example and without limitation. The insertion device 100 shown in FIGS. 1-3 is assembled over a terminal end of a hose 150 to facilitate insertion of the hose 150 during an assembly process. In various embodiments, the insertion device 100 includes a body 102 that defines a longitudinal axis A. The body 102 is substantially symmetric about the longitudinal axis A. The body 102 is separable into a first half and a second half such that the first and second halve interact such that the device 100 encircles the end of the hose 150, as shown in FIG. 3. In other words, the insertion device 100 is a clamshell design that can be clamped or assembled on an exterior surface 152 of the hose 150.

The body 102 includes a wall 110 having an outer surface 112 and an inner surface 114. The inner surface 114 defines a cylindrical opening 116 through the body 102. The cylindrical opening 116 through the body is arranged about the longitudinal axis A of the body 102.

The body 102 includes a first portion 104, a second portion 106, and a third portion 108. The first portion 104 is separated from the second portion 106 by a first edge 105 and the second portion 106 is separated from the third portion 108 by a second edge 107.

The first portion 104 is located at a first end of the body 102. At least a portion of the inner surface 114 in the first portion 104 includes a gripping surface 109. In some embodiments, the gripping surface 109 interfaces with the exterior surface 152 of the component, such as the hose 150, as shown in FIG. 3. In various embodiments, the gripping surface 109 includes threads or other spaced protrusions that provide a textured inner surface to increase the friction between the insertion device 100 and the exterior surface of the component, such as the exterior surface 152 of the hose 150.

The second portion 106 is positioned between the first portion 104 and the third portion 108. The inner surface 114 within the second portion 106 defines a larger cylindrical volume than the cylindrical volume defined by the inner surface 114 of the first portion 104. In other words, the inner surface 114 within the second portion 106 is at a greater radius from the longitudinal axis A of the body 102 than the inner surface 114 within the first portion 104. The larger cylindrical volume defined by the second portion 106 allows the component, such as the hose 150, to expand during the insertion process, which minimizes the resistance of the insertion.

The third portion 108 is located at a second end of the body 102 opposite the first end. The third portion 108 defines a conical section at the front end of the insertion device 100 to align and stabilize the component, such as the hose 150, during the insertion process. A first surface 111 is configured to interface with a terminal end of the hose 150. The first surface 111 is contiguous with a second surface 113 that defines a cylinder with a smaller radius than the radius of the cylinder defined by the inner surface 114 at the second portion 106. A conical surface 116 is contiguous with the second surface 113 and extends beyond and flares outward of the end of the component, such as the hose 150, when the component is assembled with the insertion device 100 for an insertion process. The first surface 111 and second surface 113 define a lip that interfaces with an end of the component, such as the hose 150, when the body 102 is assembled around the end of the hose 150.

Figure 4:
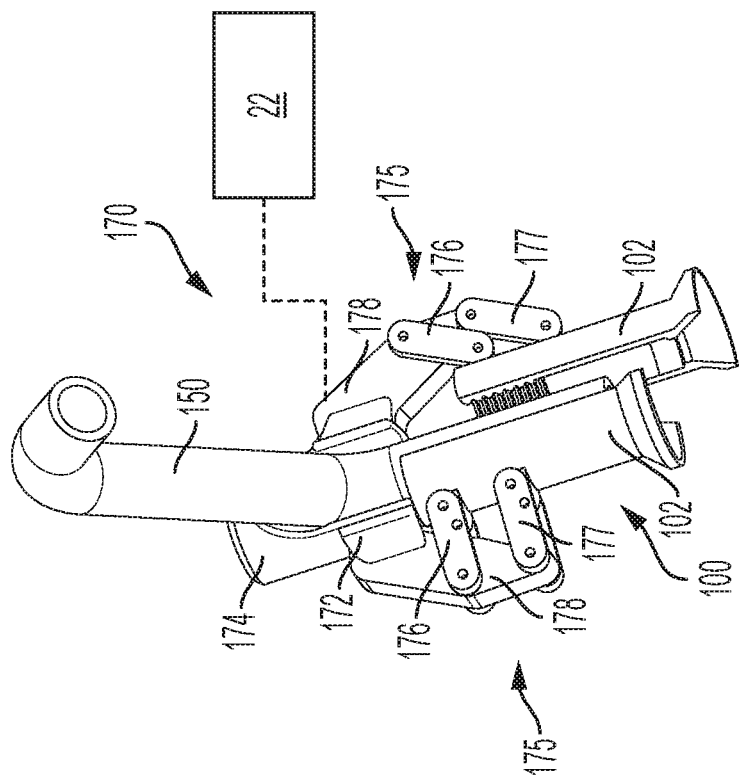
FIG. 4 is a perspective view of an effector assembly for an insertion operation, according to an embodiment.

FIG. 4 illustrates an effector 170 configured to interface with the insertion device 100. Each body 102 of the insertion device 100 is supported by parallelogram mechanisms 175 to firmly hold the component, such as the hose 150. Each parallelogram mechanism 175 includes a first link 176 and a second link 177. Each of the first and second links 176, 177 has a first end rotatably coupled to the body 102 of the insertion device 100 and a second end rotatably coupled to an arm 178. Each parallelogram mechanism 175 is coupled to a portion of the body 102 when the body 102 is separated into two pieces longitudinally. Each arm 178 is coupled to an effector body 172 that is configured to interface with and support the component, such as the hose 150. In various embodiments, each parallelogram mechanism 175 is configured to automatically release when the component, such as the hose 150, is inserted into or mated with the desired component at the insertion location. In various embodiments, each parallelogram mechanism 175 is released by a mechanical or electrical switch. In various embodiments, each parallelogram mechanism 175 is in electronic communication with a controller, such as a controller 22.

While depicted as a single unit for illustrative purposes, the controller 22 may additionally include one or more other controllers, collectively referred to as a "controller." The controller 22 may include a microprocessor or central processing unit (CPU) or graphical processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions.

In various embodiments, the effector body 172 includes a mating member 174. The mating member 174 is, in various embodiments, a tube that interfaces with an insertion mechanism, including any of the insertion mechanisms discussed herein, such as, for example and without limitation, a handle, rod, or post that can be manipulated by an operator from a distance to facilitate insertion of the component, such as the hose 150, during an assembly operation.

As shown in FIG. 5, the effector 170 is coupled with an insertion mechanism 200. The insertion mechanism 200, in the illustrated embodiment, is a rod 202. The rod 202 interfaces with the effector 170 via the mating member 174. In various embodiments, the rod 202 fits within the mating member 174 and is secured to the effector 170 via friction and/or any mechanical means, such as one or more fasteners (e.g., bolts, screws, etc.) or via one or more clamps, for example and without limitation. The rod 202 can be handled or gripped by the operator in various positions along the length of the rod 202. In various embodiments, the rod 202 is a handle that the operator grips with one or two hands. The rod 202 allows the operator to apply an insertion force on the component, such as the hose 150, from a position offset of the insertion location for the component. The insertion mechanism 200 facilitates the insertion of the component, such as the hose 150, to an insertion location 135 that traditionally would place the operator in an awkward and non-ergonomic position.

In various embodiments, as shown in FIG. 5, a sensor 26 is coupled to or in electronic communication with the effector 170. In various embodiments, the sensor 26 includes an imaging sensor such as a camera configured to provide imaging of the insertion location for enabling occluded insertions. Additionally, in various embodiments, an actuator 30 is coupled to the effector 170 and/or the insertion device 100. The actuator 30 provides an active impulsive force, such as a dithering, to aid in the insertion of the component at the insertion location. In various embodiments, the sensor 26 and the actuator 30 are in electronic communication with the controller 22. In various embodiments, the controller 22 is configured to generate a signal such as a display image, auditory feedback, or haptic feedback to the operator during the insertion operation. In various embodiments, the controller 22 also provides verification of a successful component insertion via analysis of data obtained from the sensor 26.

Figure 6:
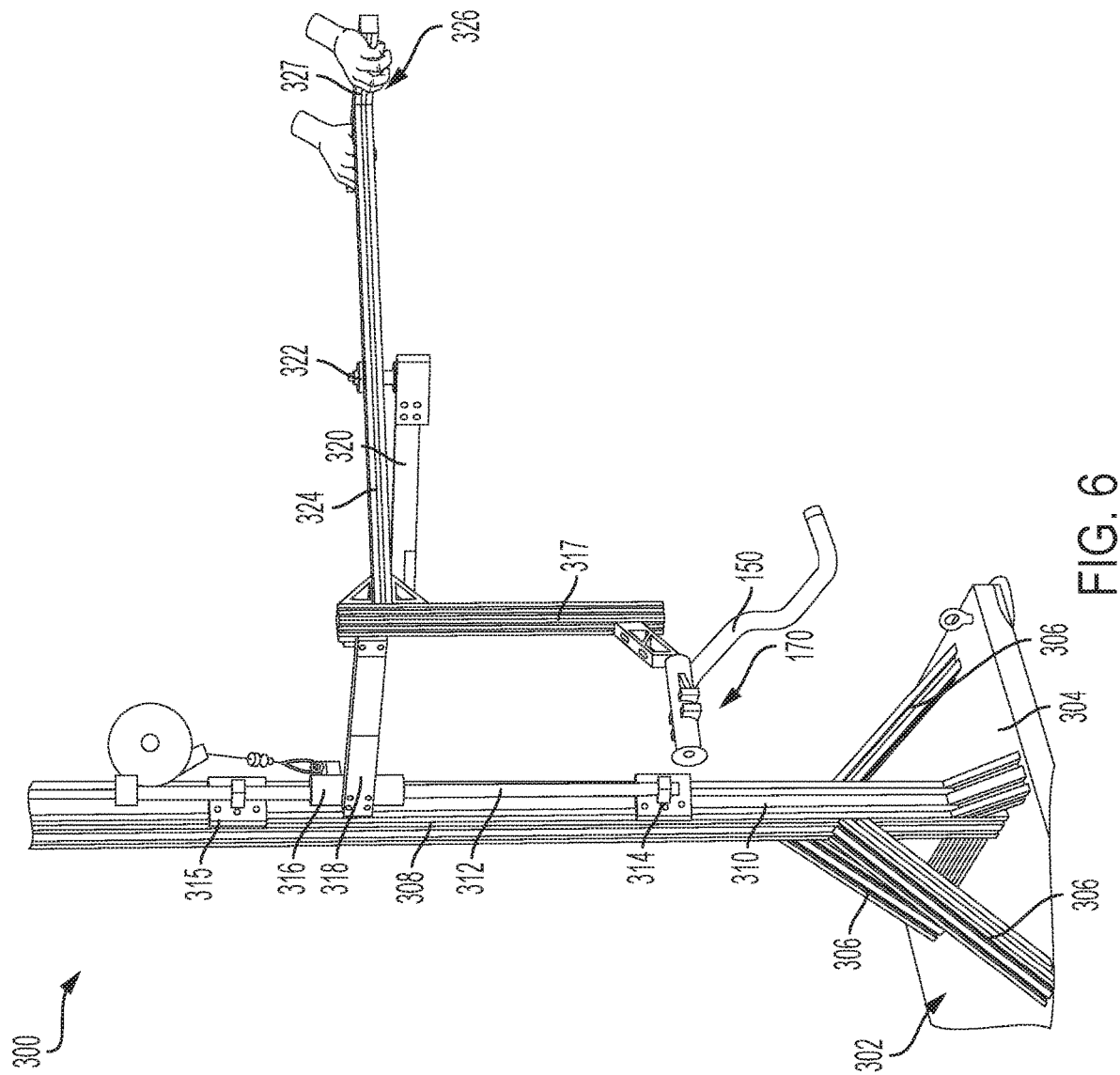
FIG. 6 is a perspective view of another insertion mechanism, according to an embodiment.
Figure 7:
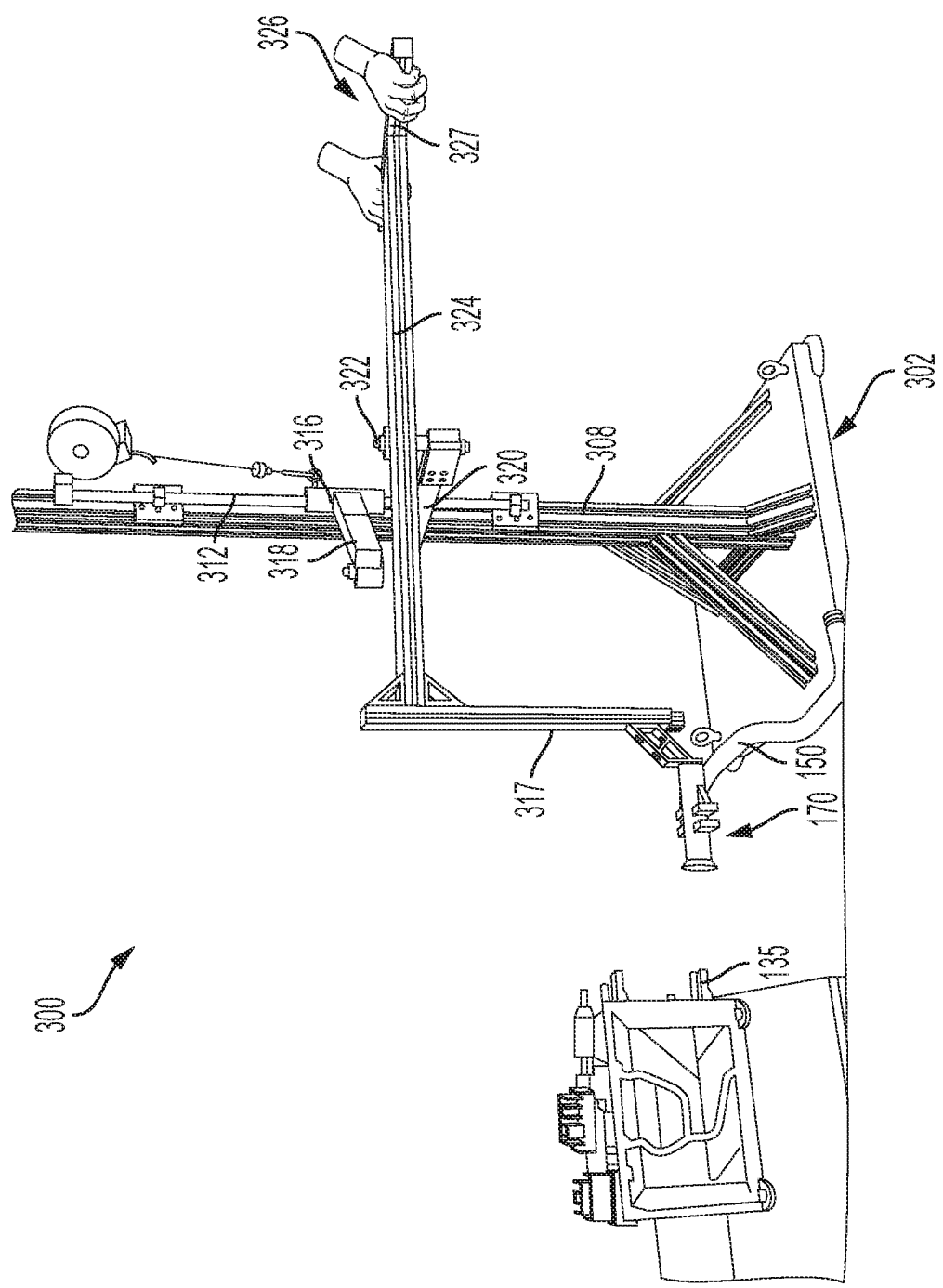
FIG. 7 is a perspective view of the insertion mechanism of FIG. 6 in a second orientation, according to an embodiment.

FIGS. 6 and 7 illustrate an insertion mechanism 300. The insertion mechanism 300 is a free-standing mechanism that uses the effector 170 and the insertion device 100 to allow the operator to perform an insertion assembly operation from a distance. The operator can use a two-handed grip to guide the operation from a distance using a pushing force rather than a lateral force. The insertion mechanism 300 constrains the insertion moment while freeing other degrees of freedom, as discussed in greater detail herein. Additionally, the insertion mechanism 300 supports or balances the weight of the component, such as the hose 150. While FIGS. 6 and 7 illustrate one embodiment, it is understood that other configurations that also constrain the rotational degree of freedom corresponding to a moment associated with an insertion force applied by the insertion device may be used to assist with the component insertion assembly.

The insertion mechanism 300 includes a stand 302. In various embodiments, the stand 302 includes a base member 304 and a plurality of support member 306 coupled to the base member 304 and supporting a vertical support member 308. The vertical support member 308 includes at least one vertically extending groove or track 310. The vertically extending groove 310 provides a plurality of attachment locations for a first attachment member 314 and a second attachment member 315 that support a vertical adjustment member 312. The first and second attachment members 314, 315 are adjustably coupled to the vertical support member 308 such that the position of the vertical adjustment member 312 is adjustable in the vertical direction. While illustrated in FIGS. 6 and 7 as supported by the stand 302 supported by the ground, in various embodiments, the insertion mechanism 300 is supported by a ceiling or other overhead structure.

A slidable collar 316 encircles the vertical adjustment member 312. A first end of a first horizontal member 318 is rotatably coupled to the collar 316 such that the first horizontal member 318 is permitted to rotate in a horizontal plane defined by the first horizontal member 318. The first horizontal member 318 is also adjustable vertically via the slidable collar 316 coupled to the vertical adjustment member 312.

A second end of the first horizontal member 318 is coupled to a second horizontal member 320. The second horizontal member 320 extends from the first horizontal member 318 to a rotatable coupling with a third horizontal member 324. The second horizontal member 320 is coupled at a first end to the second end of the first horizontal member 318 and at a second end to a coupling member 322. The coupling member 322 is, in various embodiments, a pin or other rotatable connection that allows the second horizontal member 320 to rotate within the horizontal plane defined by the second horizontal member 320.

The coupling member 322 couples the second horizontal member 320 to a third horizontal member 324. The coupling member 322 is positioned along the length of the third horizontal member 324 such that the second horizontal member 320 is rotatable relative to the third horizontal member 324. A first end of the third horizontal member 324 is coupled to a first vertical member 317 at a first end of the first vertical member 317. A second end of the first vertical member 317 is coupled to the effector 170.

A second end of the third horizontal member 324 is coupled to a handle assembly 326. In various embodiments, the handle assembly 326 includes a graspable member 327 that extends perpendicular to the third horizontal member 324 within the horizontal plane defined by the third horizontal member 324. The graspable member 327 provides two handle portions on either side of the third horizontal member 324. The operator manipulates the position of the hose 150 coupled to the effector 170 through a pushing force applied at the graspable member 327.

The insertion mechanism 300 is a kinematic mechanism that constrains or restricts some of the moments of the mechanism while allowing translational movement of the effector 170 and the insertion device 100. Specifically, the insertion mechanism 300 constrains moments in two (2) of the three (3) rotational degrees-of-freedom while allowing all three (3) translational degrees-of-freedom. The insertion mechanism 300 permits or enables rotation about a vertical axis defined by the vertical support member 308. The insertion mechanism 300 constrains the rotational degree of freedom corresponding to the moment associated with the insertion force applied to the insertion mechanism 300 at the graspable member 327. The insertion mechanism 300 permits or enables translational movement in both a longitudinal direction (that is, towards and way from the insertion location 135, as viewed in FIGS. 6 and 7) and a vertical direction (that is, movement upward and downward, as viewed in FIGS. 6 and 7). The first, second, and third horizontal members 318, 320, 324 can translate vertically due to the connection of the first horizontal member 318 with the vertical adjustment member 312. The first, second, and third horizontal members 318, 320, 324 can also translate within the horizontal planes defined by each of the first, second, and third horizontal members 318, 320, 324 in response to a force applied by the operator at the handle assembly 326. The first and second horizontal members 318, 320 act as torque reaction members such that the insertion mechanism 300 constrains the moments while permitting translational movement of the effector 170 and hose insertion device 100.

Figure 8:
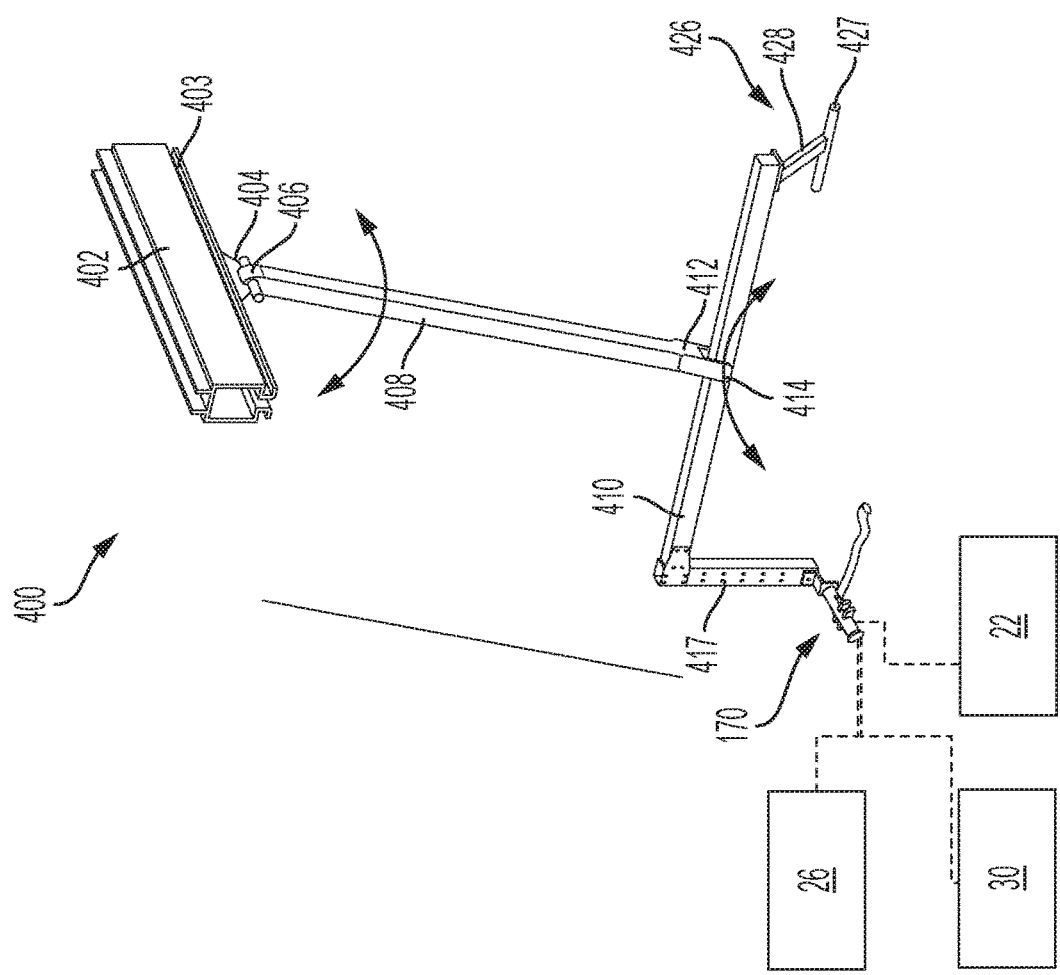
FIG. 8 is a perspective view of another insertion mechanism, according to an embodiment.

FIG. 8 illustrates another embodiment of an insertion mechanism 400. The insertion mechanism 400 is an overhead-supported mechanism that allows movement in rotational and translation degrees of freedom while constraining a rotational degree of freedom corresponding to the moment associated with the insertion force. The insertion mechanism 400 permits or enables translational and rotational movement in multiple degrees of freedom of the effector 170 to facilitate insertion and improve operator ergonomics. The insertion mechanism 400 includes a first horizontal support member 402 that in various embodiments includes a guide member 403. The guide member 403 is a rail that extends along a length of the first horizontal support member 402. A trolley 404 is rotatably coupled with a vertical support member 408 via a first coupling member 406. The trolley 404 is configured to travel within/along the guide member 403 such that the vertical support member 408 translates along an axis defined by the first horizontal support member 402. In various embodiments, the first coupling member 406 is a pinned connection between the trolley 404 and a first end of the vertical support member 408 that permits or enables the vertical support member 408 to rotate or pivot relative to the first horizontal support member 402.

The vertical support member 408 is coupled at a second end to a second horizontal member 410 via an interface member 412. The interface member 412 is, in various embodiments, a Y-shaped member that interfaces on one end with the vertical support member 408 and at an opposite end with opposite sides of the second horizontal member 410. The interface member 412 is coupled to the second horizontal member 410 with a second coupling member 414. The second coupling member 414 is a pinned connection between the second horizontal member 410 and the interface member 412 that permits or enables the second horizontal member to pivot or rotate relative to the vertical support member 408. The second horizontal member 410 is coupled to the vertical support member 408 at approximately a mid-point of the length of the second horizontal member 410. The second horizontal member 410 is thus able to pivot about a mid-point of its length in response to operator direction.

A first end of the second horizontal member 410 is coupled with a first vertical member 417. The first vertical member 417 connects the second horizontal member 410 with the effector 170. A second end opposite the first end of the second horizontal member 410 is coupled with a handle assembly 426. The handle assembly 426 includes a connection member 428 and a graspable member 427. The graspable member 427 provides two handle portions on either side of the connection member 428 and the second horizontal member 410. The operator manipulates the position of the component coupled to the effector 170, such as the hose 150, through a pushing force applied at the graspable member 427.

In various embodiments, as shown in FIG. 8, a sensor 26 is coupled to or in electronic communication with the effector 170. In various embodiments, the sensor 26 includes an imaging sensor such as a camera configured to provide imaging of the insertion location for enabling occluded insertions. Additionally, in various embodiments, an actuator 30 is coupled to the effector 170 and/or the insertion device 100. The actuator 30 provides an active impulsive force, such as a dithering, to aid in the component insertion. In various embodiments, the sensor 26 and the actuator 30 are in electronic communication with the controller 22. In various embodiments, the controller 22 is configured to generate a signal such as a display image, auditory feedback, or haptic feedback to the operator during the insertion operation. In various embodiments, the controller 22 also provides verification of a successful component insertion via analysis of data obtained from the sensor 26.

In various embodiments, the insertion device 100 is configured to fit over a hose clamp that encircles the exterior surface 152 of the component, such as the hose 150. The gripping surface 109 interfaces with the exterior surface 152 of the component, such as the hose 150, as the insertion device 100 interfaces with the hose clamp via any type of clamp engagement means extending from the inner surface 114 of the body 102. In various embodiments, the clamp engagement means are released and engaged in response to control signals received by an actuator, such as the actuator 30, coupled to the insertion device 100.

In some embodiments, as the insertion process is completed, the insertion device 100 is released from around the component, such as the hose 150, while retaining an engagement with a tension release ring of the hose clamp. The release of the insertion device 100 pulls or removes the ring from the hose clamp. In various embodiments, once the insertion device 100 and ring are withdrawn, a sensor, such as the sensor 26, generates data regarding a successful removal of the tension release ring to indicate hose clamp tension was achieved in the assembly operation. In various embodiments, the ring is released from the insertion device 100 by retraction or release of the clamp engagement means.

While exemplary embodiments of insertion mechanisms are disclosed herein, it is understood that other configurations that support a component during an insertion process, such as a hose, constrain some of the moments related to the application of force to insert the component at an insertion location, and permit vertical and horizontal planar translation of the end of the component to align the component with the insertion location using a pushing force are also within the scope of this disclosure.

Additionally, while the exemplary embodiments disclosed herein are discussed in reference to a hose insertion process, it is understood that the insertion mechanisms, insertion devices, and effectors discussed herein may be used to assist operators with assembly operations including other components, such as spark plugs, electric connectors, etc., for example and without limitation.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of sonic or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An insertion device, comprising a body defining a longitudinal axis, the body including a wall having an outer surface and an inner surface defining a cylindrical opening through the body, the body further including a first portion, a second portion, and a third portion arranged along a length of the body, the first portion positioned at a first end of the body and including a gripping surface arranged on the inner surface, the second portion positioned contiguous with the first portion and the inner surface of the second portion defining an expansion area, and the third portion positioned at a second end of the body opposite the first end and defining a conical section at the second end of the body.

2. The insertion device of claim 1, wherein the body comprises a first body portion and a second body portion formed by separating the body along the longitudinal axis.

3. The insertion device of claim 1, wherein the third portion includes a first surface contiguous with a second surface such that the first and second surfaces define a lip extending from the inner surface of the body.

4. The insertion device of claim 1, wherein the gripping surface includes a plurality of threads.

5. An insertion system, comprising:
   an insertion device comprising a body defining a longitudinal axis, the body including a wall having an outer surface and an inner surface defining a cylindrical opening through the body, the body having a first body portion and a second body portion formed by separating the body along the longitudinal axis;
   an effector configured to interface with the insertion device, the effector having an effector body, a first mechanism coupled to the effector body and coupled to the first body portion of the insertion device, and a second mechanism coupled to the effector body and coupled to the second body portion of the insertion device; and
   an insertion mechanism coupled with the effector body;
   wherein the insertion mechanism is configured to enable an insertion force application at a position offset from the insertion device.

6. The insertion system of claim 5 further comprising a sensor coupled to the insertion device and a controller in electronic communication with the sensor, the sensor configured to generate imaging data of a terminal end of the insertion device during an insertion process.

7. The insertion system of claim 6 further comprising an actuator coupled to the insertion device and in electronic communication with the controller, the actuator providing an active impulsive force to the insertion device during the insertion process.

8. The insertion system of claim 5, wherein the body of the insertion device further comprises a first portion, a second portion, and a third portion arranged along a length of the body.

9. The insertion system of claim 8, wherein the first portion is positioned at a first end of the body and includes a gripping surface arranged on the inner surface, the second portion is positioned contiguous with the first portion and the inner surface of the second portion defines an expansion area, and the third portion is positioned at a second end of the body opposite the first end and defines a conical section at the second end of the body.

10. The insertion system of claim 9, wherein the third portion includes a first surface contiguous with a second surface such that the first and second surfaces define a lip extending from the inner surface of the body.

11. The insertion system of claim 5, wherein the insertion mechanism comprises a rod such that the force application is applied parallel to the longitudinal axis defined by the body of the insertion device.

12. The insertion system of claim 5, wherein the insertion mechanism comprises a stand including a base member and a plurality of support members coupled to the base member, a vertical support member coupled to the base member and coupled to the support members, a vertical adjustment member coupled to and parallel to the vertical support member, a collar encircling the vertical adjustment member, a first horizontal member, a second horizontal member, and a third horizontal member, the first horizontal member rotatably coupled to the collar at a first end and rotatably coupled to the second horizontal member at a second end, the second horizontal member rotatably coupled to the third horizontal member, and the third horizontal member coupled at a first end to the effector via a first vertical member and coupled at a second end to a handle assembly.

13. The insertion system of claim 12, wherein the insertion mechanism permits rotation only about the vertical support member and constrains moments related to an insertion force applied to the insertion mechanism at the handle assembly.

14. The insertion system of claim 5, wherein the insertion mechanism comprises a first horizontal member, a second horizontal member, a vertical support member, a first vertical member, and a trolley, the first horizontal member including a guide member such that the trolley travels within the guide member, the first horizontal member rotatably coupled to the vertical support member, the second horizontal member rotatably coupled to the vertical support member, and the second horizontal member coupled at a first end to the effector via the first vertical member and coupled at a second end to a handle assembly.

15. An insertion system, comprising:
an insertion device comprising a body defining a longitudinal axis, the body including a wall having an outer surface and an inner surface defining a cylindrical opening through the body, the body having a first body portion and a second body portion formed by separating the body along the longitudinal axis;
an effector configured to interface with the insertion device, the effector having an effector body, a first mechanism coupled to the effector body and coupled to the first body portion of the insertion device, and a second mechanism coupled to the effector body and coupled to the second body portion of the insertion device, the first mechanism including a first link and a second link parallel to the first link and the second mechanism including a third link and a fourth link parallel to the third link; and
an insertion mechanism coupled with the effector;
wherein the insertion mechanism allows movement in rotational and translational degrees of freedom and enables an insertion force application at a position offset from the insertion device while constraining a rotational degree of freedom corresponding to a moment associated with the insertion force.

16. The insertion system of claim 15 further comprising a sensor coupled to the insertion device and a controller in electronic communication with the sensor, wherein the sensor is configured to generate imaging data of a terminal end of the insertion device during an insertion process.

17. The insertion system of claim 16 further comprising an actuator coupled to the insertion device and in electronic communication with the controller, the actuator providing an active impulsive force to the insertion device during the insertion process.

18. The insertion system of claim 15, wherein the body of the insertion device further comprises a first portion, a second portion, and a third portion arranged along a length of the body, wherein the first portion is positioned at a first end of the body and includes a gripping surface arranged on the inner surface, the second portion is positioned contiguous with the first portion and the inner surface of the second portion defines an expansion area, and the third portion is positioned at a second end of the body opposite the first end and defines a conical section at the second end of the body.

19. The insertion system of claim 15, wherein the insertion mechanism comprises a stand including a base member and a plurality of support members coupled to the base member, a vertical support member coupled to the base member and coupled to the support members, a vertical adjustment member coupled to and parallel to the vertical support member, a collar encircling the vertical adjustment member, a first horizontal member, a second horizontal member, and a third horizontal member, the first horizontal member rotatably coupled to the collar at a first end and rotatably coupled to the second horizontal member at a second end, the second horizontal member rotatably coupled to the third horizontal member and the third horizontal member coupled at a first end to the effector via a first vertical member and coupled at a second end to a handle assembly, and wherein the insertion mechanism permits rotation only about the vertical support member and constrains moments related to an insertion force applied to the insertion mechanism at the handle assembly.

20. The insertion system of claim 15, wherein the insertion mechanism comprises a first horizontal member, a second horizontal member, a vertical support member, a first vertical member, and a trolley, the first horizontal member including a guide member such that the trolley travels within the guide member, the first horizontal member rotatably coupled to the vertical support member, the second horizontal member rotatably coupled to the vertical support member, and the second horizontal member coupled at a first end to the effector via the first vertical member and coupled at a second end to a handle assembly.

* * * * *